Sept. 1, 1959  G. C. BALDWIN  2,902,604
SCINTILLATION CONVERTER
Filed Sept. 26, 1955
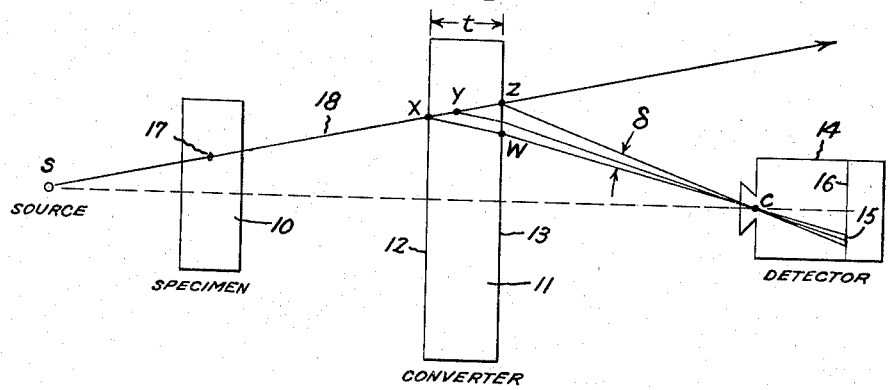
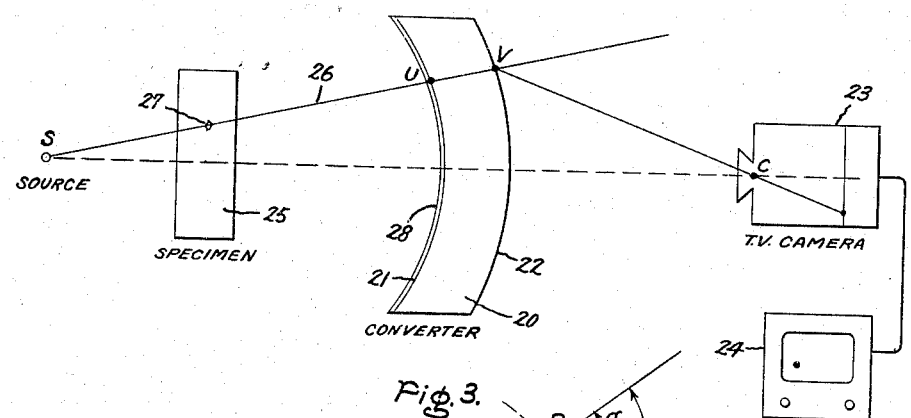
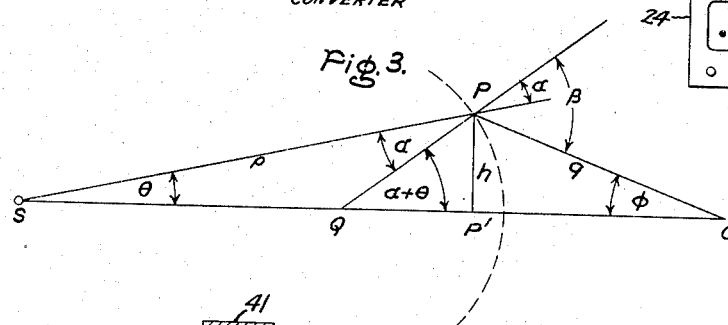
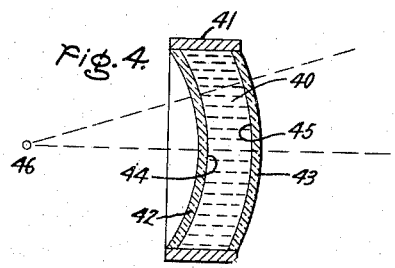
Inventor:
George C. Baldwin,
by Paul A. Frank
His Attorney.

United States Patent Office 2,902,604
Patented Sept. 1, 1959

2,902,604

SCINTILLATION CONVERTER

George C. Baldwin, Albany, N.Y., assignor to General Electric Company, a corporation of New York Application September 26, 1955, Serial No. 536,558

9 Claims. (Cl. 250—71)

This invention relates to an improved scintillation converter and, more particularly, to such a scintillation converter adapted for use in a radiant energy image intensifier system having a radiant energy source and an image detector. The converter is interposed between the source and detector and has lenticular, lens shaped, surfaces formed in a manner that allows the scintillation image to be exhibited remotely with a minimum loss of definition.

As used throughout the specification, the term "scintillation converter" refers to the scintillation crystal or other medium in which a light image is created by the conversion of the incident radiations; "radiant energy" refers to those non-visible photon and particle radiations such as X-rays, gamma rays, electrons and neutrons which give rise to scintillations, or flashes of visible light, upon traversing a selected scintillation medium, "radiant energy path thickness" refers to the thickness of the scintillation converter as measured along a line drawn from the radiation source.

While the invention is subject to a wide range of applications, as in a focal spot camera to image an extended source in visible light or in a neutron source-hydrogenous converter system, it is especially applicable where X-rays emanating from a source of small dimensions, such as a betatron target, traverse a thick object and impinge upon a thick scintillation converter such as a thallium-activated sodium iodide crystal. The resulting scintillation image may be amplified and displayed remotely by means of a closed-circuit television system. The invention will be particularly described in this connection.

Converters which have previously been used for such purposes are disc shaped scintillation crystals with parallel entrant and emergent surfaces. The converter is interposed between an object illuminated by X-rays and a visual image detector so that the X-ray shadow-image of the object falls upon the crystal and produces a scintillation image which may be viewed remotely. With such a converter there is a loss of definition in the scintillation image due to the aberration akin to astigmatism and which may be called radial astigmatism. That is, the X-ray image of a point object is not displayed by the converter as a point scintillation but rather as a radially directed line focus of point scintillations.

While in certain prior scintillation converters this definition loss has been diminished, it has been accomplished either by decreasing the crystal thickness and concomitantly reducing its sensitivity, or by employing expensive and complicated auxiliary non-scintillating correcting lenses. It is highly desirable that maximum conversion efficiency and definition be obtained in the converter itself in order to present the brightest image to a detector. Since source strengths are limited and crystal characteristics fixed, the brightest image may only be obtained with a thick crystal which inherently provides for correction of this astigmatic aberration.

It is an object of this invention, therefore, to provide an improved scintillation converter which itself produces improved definition in the scintillation image without loss of sensitivity.

It is a further object of this invention to provide, in a radiant energy intensifier system, a scintillation converter which refracts through the optical center of a detector substantially all of the light, arising in the scintillation medium and directed along a line drawn from the source, regardless of the thickness of the scintillation medium.

According to this invention, the scintillation converter has emergent and entrant surfaces curved lenticularly so that a point in an investigated object is displayed to a detector as a well defined point.

For a better understanding of the present invention, together with other and further objects thereof, reference is had to the following description taken in connection with the accompanying drawing and its scope will be pointed out in the appended claims.

In the drawing, Figure 1 is a schematic representation of a prior art scintillation converter in a radiant energy image intensifier system; Fig. 2 is a schematic representation of a scintillation converter according to the present invention in a radiant energy intensifier system; Fig. 3 is a ray diagram of the system of Fig. 2; and Fig. 4 is a cross-section elevation view of a modification of the scintillation converter of Fig. 2.

Referring to Fig. 1 of the drawing, there is shown a schematic diagram of a radiant energy image intensifier system including a prior scintillation converter. This system comprises an X-ray source S, a specimen undergoing investigation 10, a scintillation crystal 11 with parallel entrant and emergent surfaces 12 and 13 respectively, and an image detector 14. X-rays from the source S penetrate the specimen 10 and the crystal 11. A portion of the X-ray beam, more or less depending upon crystal characteristics and thickness, gives rise to scintillations upon conversion in the crystal. The scintillation light is emitted from the crystal, a useful portion being focussed by the detector 14 at its optical center C to produce an image 15 on an image plane 16.

The attenuation of the X-ray beam in the specimen 10 is a function of the areal density, mass per unit area, traversed by the beam and the number of scintillations produced in a given scintillation medium is related inversely to the attenuation of the radiation. Hence, radiation passing through a void 17 or other non-homogeneity in the specimen will produce correspondingly more or fewer scintillations in the converter 11 than radiation passing through homogeneous areas of the same total thickness. The image produced by focussing the light arising as scintillations in the crystal will exhibit darker and lighter areas corresponding to the more dense and less dense areas of the specimen, respectively. Important visual information about the internal structure of very dense specimens may thus be obtained.

Aberration, or loss of definition in the image, is a significant limitation in the system of Fig. 1. Consider a representative single ray 18 passing from the source S through the specimen 10 so as to traverse a minute void 17 and passing through the crystal 11. At random points along the radiant energy path XZ visible light is produced by the scintillation phenomena. Thus, there is a line locus of points exhibited by the crystal to the detector for each point in the object. This is an aberration effecting a loss of definition in the final image.

For example a light ray passing through the detector optical center from point X is refracted along the line XWC, a light ray from point Z is refracted along the line ZC, and rays from intermediate points may be drawn similarly. The line locus of points, XZ, subtends a finite angle $\delta$ at the detector, and, therefore, the image of a point in the object is displayed on the image plane 16 as a radially directed line segment 15. The angle $\delta$ and the deviation from a point image depend upon the obliquity of the incident ray 18 and upon the thickness $t$ of the converter 11.

Since the primary function of a radiant energy image intensifier system is to present the most efficient conversion of non-visible radiant energy into light, a thick converter is desired. However, the lack of definition inherent in prior systems as illustrated in Fig. 1 forces a compromise between sensitivity and resolution and dictates the choice of a relatively thin converter.

Referring now to Fig. 2, there is shown a schematic illustration of a radiant energy intensifier system embodying a scintillation converter according to the present invention. The scintillation converter 20 is an improvement upon the prior art in the configuration of the curved entrant and emergent surfaces, 21 and 22 respectively. The converter is shown in conjunction with an X-ray source S of small dimensions such as a betatron target, a television camera 23 as an image detector, and a television screen 24 as a display means allowing remote observation of an overall optical image of the specimen 25.

According to this invention, the emergent surface 22 of the converter 20 is curved lenticularly, convex with respect to the source, to refract, in a direction through the detector optical center C any emergent light ray which was directed, in the crystal, along a line passing through the source. For example, a representative ray 26 generated by the source S is shown traversing a point discontinuity 27 in the specimen 25. Scintillations may occur at any point along the line UV. Owing to the curvature of the emergent surface 22 the only light imaged by the detector is that which travels along line UV in the crystal.

Entrant surface 21 is a portion of a spherical surface described about the source and is provided with a mirror means 28 such as a reflecting metallic film. Light produced in the converter and travelling in a direction toward the source is reflected back upon itself and thus contributes to the useful light imaged by the detector 23.

Alternatively, where it is desired to have uniform sensitivity, the reflecting means 28 may be omitted and the entrant surface 21 curved so that at each point it is a constant distance from the emergent surface 22 as measured in a direction through the source. The converter will then have a constant radiant energy path thickness and have uniform sensitivity for the production of scintillations.

With reference to Fig. 3, an equation for the required radius of curvature, $r=PQ$, of the emergent surface may be developed as follows:

Let P be any point on the emergent surface of the crystal at a distance $p$ from the source S and at a distance $q$ from the detector optical center C. Let $h=PP'$ where P' is the intersection of a perpendicular from P to the axis SC. Let $\mu$ be the index of refraction, crystal relative to contiguous medium. Ray SP is incident at an angle $\alpha$ with PQ, the normal to the emergent surface. Ray SP subtends an angle $\theta$ with the axis SC.

Snell's law of refraction, $$\mu = \frac{\sin \beta}{\sin \alpha}$$

must be satisfied. Therefore, light originating at points in the crystal along the ray SP and emerging at P must be refracted at angle $\beta$ with the normal PQ and subtend an angle $\phi$ with the axis SC. In practical cases, the distance $p$ is much greater than the required emergent surface diameter so that no significant error is introduced by employing the small angle form of Snell's law, $\mu = \beta/\alpha$.

It follows then that the included angles may be expressed as:

$$\theta = h/p, \quad \phi = h/q, \quad \alpha + \theta = h/r, \quad \alpha = h/r - h/p$$

$$\mu\alpha = \beta = \phi + \theta + \alpha$$

$$\alpha(\mu - 1) = \phi + \theta$$

combining:

$$(\mu - 1)(h/r - h/p) = h/p + h/q$$

and, simplifying $$r = (\mu - 1)/(\mu/p + 1/q)$$

Since the radius of curvature $r$ is independent of $h$ it is evident that the required emergent surface is spherical with its center at Q.

In an application where the source to emergent surface distance $p$ was chosen as 59.06 inches and the detector to emergent surface distance $q$ chosen as 7.50 inches, the radius of curvature for a NaI (Tl) crystal, $\mu = 1.775$, becomes 4.75 inches.

Fig. 4 illustrates a further modification of this invention wherein a liquid scintillation medium 40 is contained by a ring shaped perimetral enclosure 41 an entrant wall 42, and an optically transparent emergent wall 43. Any suitable cement may be used to bond these parts together. Since the scintillation liquid assumes the shape of the inner surfaces of its container the entrant wall inner surface 44 and the emergent wall inner surface 45 are curved in the same manner as the emergent and entrant surfaces disclosed in connection with Figs. 2 and 3 to produce a scintillation converter which corrects for radial astigmatism.

While there have been described what are at present considered to be preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. A scintillation converter for use in a radiant energy image intensifier system having a source for the production of radiant energy radiations and a visible image detector to focus a scintillation image at an optical center, said converter being interposed on the axis between said source and said detector and comprising optically transparent scintillation means having coaxially opposed entrant and emergent surfaces concave with respect to said source, said entrant surface intersecting said axis at a first fixed point and being curved symmetrically and lenticularly about said axis, and said emergent surface intersecting said axis at a second fixed point and being curved symmetrically and lenticularly about said axis to reduce definition loss in the scintillation image.

2. A scintillation converter for use in a radiant energy image intensifier system having a source for the production of radiant energy radiations and a visible image detector to focus a scintillation image at an optical center, said converter being interposed on the axis between said source and said detector and comprising optically transparent scintillation means having coaxially opposed entrant and emergent surfaces concave with respect to said source, said entrant surface intersecting said axis at a first fixed point and being curved symmetrically and lenticularly about said axis, and said emergent surface intersecting said axis at a second fixed point and being curved symmetrically about said axis substantially according to the relationship $r = (\mu - 1)/(\mu/p - 1/q)$ where $r$ is the radius of curvature of the emergent surface, $\mu$ is the index of refraction of the converter at the emergent surface, $p$ is the source to emergent surface distance, and $q$ is the focal point to emergent surface distance.

3. A scintillation converter for use in a radiant energy image intensifier system having a source for the production of radiant energy radiations and a visible image detector to focus a scintillation image at an optical center, said converter being interposed on the axis between said source and said detector and comprising optically transparent scintillation means having coaxially opposed entrant and emergent surfaces concave with respect to said source, and mirror means in contact with said entrant surface to reflect internally scintillations produced in the said converter, said entrant surface intersecting said axis at a first fixed point and being a portion of a spherical surface described about said source, and said emergent surface intersecting said axis at a second fixed point and being curved symmetrically and lenticularly about said axis to reduce definition loss in the scintillation image.

4. A scintillation converter for use in a radiant energy image intensifier system having a source for the production of radiant energy radiations and a visible image detector to focus a scintillation image at an optical center, said converter being interposed on the axis between said source and said detector and comprising optically transparent scintillation means having coaxially opposed entrant and emergent surfaces concave with respect to said source, and mirror means in contact with said entrant surface to reflect internally scintillations produced in the said converter, said entrant surface intersecting said axis at a first fixed point and being a portion of a spherical surface described about said source, and said emergent surface intersecting said axis at a second fixed point and being curved symmetrically about said axis substantially according to the relationship $r=(\mu-1)/(\mu/p-1/q)$ where $r$ is the radius of curvature of the emergent surface, $\mu$ is the index of refraction of the converter at the emergent surface, $p$ is the source to emergent surface distance, and $q$ is the focal point to emergent surface distance.

5. A scintillation converter for use in a radiant energy image intensifier system having a source for the production of radiant energy radiations and a visible image detector to focus a scintillation image at an optical center, said converter being interposed on the axis between said source and said detector and comprising optically transparent scintillation means having coaxially opposed entrant and emergent surfaces concave with respect to said source, said converter having a constant radiant energy path thickness, said entrant surface intersecting said axis at a first fixed point and being curved symmetrically and lenticularly about said axis, and said emergent surface intersecting said axis at a second fixed point and being curved symmetrically and lenticularly about said axis to reduce definition loss in the scintillation image.

6. A scintillation converter for use in a radiant energy image intensifier system having a source for the production of radiant energy radiations and a visible image detector to focus a scintillation image at an optical center, said converter being interposed on the axis between said source and said detector and comprising optically transparent scintillation means having coaxially opposed entrant and emergent surfaces concave with respect to said source, said converter having a constant radiant energy path thickness, said entrant surface intersecting said axis at a first fixed point and being curved symmetrically and lenticularly about said axis, and said emergent surface intersecting said axis at a second fixed point and being curved symmetrically about said axis substantially according to the relationship, $r=(\mu-1)/(\mu/p-1/q)$, where $r$ is the radius of curvature of the emergent surface, $\mu$ is the index of refraction of the converter at the emergent surface, $p$ is the source to emergent surface distance, and $q$ is the focal point to emergent surface distance.

7. A scintillation converter for use in a radiant energy image intensifier system having a source for the production of radiant energy radiations and a visible image detector to focus a scintillation image at an optical center, said converter being interposed on the axis between said source and said detector and comprising a transparent optically homogeneous scintillation liquid, a perimetral enclosure, an entrant wall and an emergent wall coaxially opposed and affixed to said enclosure, each of said walls having an inner surface and an outer surface concave with respect to said source, said scintillation liquid being in contact with the inner surfaces of both walls, said inner surface of said entrant wall intersecting said axis at a first fixed point and being curved symmetrically and lenticularly about said axis, and said inner surface of said emergent wall intersecting said axis at a second fixed point and being curved symmetrically and lenticularly about said axis to reduce definition loss in the scintillation image.

8. A radiant energy image intensifier system comprising an X-ray source for the illumination of an object, a thallium-activated sodium iodide crystal scintillation converter for producing a visible image of said object, and television means for focussing said image at an optical center and transmitting and remotely displaying said image; said source, crystal, reflecting means, and television means being arranged on an axis; said crystal having coaxially opposed entrant and emergent surfaces concave with respect to said source, and mirror means in contact with said entrant surface to reflect internally scintillations produced in said converter; said entrant surface intersecting said axis at a first fixed point and being a portion of a spherical surface described about said source, and said emergent surface intersecting said axis at a second fixed point and being curved symmetrically and lenticularly about said axis to reduce definition loss in the scintillation image.

9. A radiant energy image intensifier system comprising an X-ray source for the illumination of an object, a thallium-activated sodium iodide crystal scintillation converter for producing a visible image of said object, and television means for focusing said image at an optical center and transmitting and remotely displaying said image, said source, crystal, reflecting means, and television means being arranged on an axis; said crystal having coaxially opposed entrant and emergent surfaces concave with respect to said source, and mirror means in contact with said entrant surface to reflect internally scintillations produced in said converter, said entrant surface intersecting said axis at a first fixed point and being a portion of a spherical surface described about said source, and said emergent surface intersecting said axis at a second fixed point and being curved symmetrically about said axis substantially according to the relationship, $r=(\mu-1)/(\mu/p-1/q)$ where $r$ is the radius of curvature of the emergent surface, $\mu$ is the index of refraction of the converter at the emergent surface, $p$ is the source to emergent surface distance, and $q$ is the focal point to emergent surface distance.

References Cited in the file of this patent

UNITED STATES PATENTS

| | | |
|---|---|---|
| 2,727,183 | Marshall | Dec. 13, 1955 |
| 2,739,242 | Armistead | Mar. 20, 1956 |
| 2,739,257 | Sheldon | Mar. 20, 1956 |
| 2,745,968 | Ludeman | May 15, 1956 |
| 2,768,307 | Tirico | Oct. 23, 1956 |
| 2,772,368 | Scherbatskoy | Nov. 27, 1956 |
| 2,796,532 | Teague et al. | June 18, 1957 |